Patented Feb. 27, 1951

2,543,685

UNITED STATES PATENT OFFICE 2,543,685

PRODUCTION OF LIQUID POLYMERS FROM DIHYDROPYRAN

John George Mackay Bremner, Norton-on-Tees, England, assignor to Imperial Chemical Industries Limited, a corporation of Great Britain No Drawing. Application February 13, 1947, Serial No. 728,385. In Great Britain February 26, 1946

8 Claims. (Cl. 260—333)

This invention relates to the production of valuable organic liquids.

There has been disclosed in British Specification No. 573,507 a method for the production of acrolein and ethylene which comprises heating 2,3-dihydropyran at a temperature exceeding 350° C., and in particular at temperatures within the range 450°–500° C.

We have now found that by heating 2,3-dihydropyran in the presence of a dehydration catalyst within a certain temperature range hereinafter defined, there are produced polymeric compounds, in particular mobile, relatively high boiling liquids.

According to the present invention, therefore, there is provided a process for the production of polymeric substances, in particular mobile, relatively high boiling liquids, which comprises subjecting 2,3-dihydropyran to temperatures of 150°–350° C. in the presence of a dehydration catalyst. The reaction may be conducted in the liquid or vapor phase, but is of particular value in relation to the vapor phase. Superatmospheric pressure may be employed if desired.

While any dehydration catalyst may be employed it has been found that acidic catalysts, such as aluminium silicate; acid extracted kaolin; artificial and naturally occurring zeolites such as acid extracted bentonite and Terrana earth; phosphoric acid on kieselguhr; alumina on silica gel, are very suitable. Preferably all these catalysts are employed in granular form, e. g. as pellets.

While these valuable polymers may be obtained by operating within the aforesaid range of temperature improved yields can be obtained by suitable selection of space velocity and pressure. Thus the use of high space velocities and/or the use of inert diluent or carrier gases, permits the use of higher temperatures within the aforesaid range. With acidic catalysts it has been found most suitable to operate at atmospheric pressure within the range 250°–350° C., and preferably within the range 300°–350° C. When superatmospheric pressure is employed the preferred ranges of temperature are lower than those mentioned. Working at atmospheric pressure space velocities of up to 1 hour$^{-1}$, that is 1 liter of liquid dihydropyran per liter of catalyst volume per hour, are suitable, and space velocities in the neighborhood of 0.4 hour$^{-1}$ are preferred. In general with increasing temperature more viscous products are obtained.

The reaction may be conducted, for example, in a tubular reactor constructed of a refractory material inert to the reactants and/or products, for example, heat-resistant glass, such as borosilicate glass. This tube is packed with the catalyst which is preferably granular. The catalyst may be arranged as a continuous bed, or on the spaced bed principle, that is with layers of catalyst separated from one another by a non-catalytic refractory material. Careful temperature control is desirable.

The dihydropyran may be produced in situ, for example by subjecting tetrahydrofurfuryl alcohol in the vapor phase to a temperature of about 350° C. in the presence of a dehydration catalyst, and then subjecting the products to the process of the present invention. Thus, for example, a mass of a dehydration catalyst such as basic aluminium phosphate may be arranged to have a temperature gradient through it such that the tetrahydrofurfuryl alcohol comes in contact with catalyst maintained at about 350° C. and then passes to a region containing dehydration catalyst maintained at 150°–350° C. When the reaction is conducted in the liquid phase, it is, of course, necessary to employ superatmospheric pressure.

The products of the present invention are chiefly highly mobile, high boiling liquids but a small proportion of resin-like solid polymers suitable, for example, as resin modifiers is also obtained. The liquid polymeric substances are suitable for use as hydraulic fluids in mechanical systems and as solvents. They are also suitable for use as modifiers of synthetic resins and other polymers.

The characteristics of representative polymers and the reaction conditions employed in their production are given in the following table.

Table

| Reaction Conditions | | | | Properties of polymers | | | | | |
|---|---|---|---|---|---|---|---|---|---|
| Pressure | Temp., °C. | Space velocity, hours$^{-1}$ | Catalyst | B. P., °C. | $d_4^{20}$ | Viscosity, centipoises @20° C. | Composition by weight; per cent | | |
| | | | | | | | C | H | O |
| Atmospheric | 275 | 0.4 | Phosphoric Acid on Kieselguhr. | 170–200, 760 mm<br>200–270, 760 mm | 0.904<br>0.943 | 1.27<br>6.65 | 89.3<br>87.7 | 9.7<br>9.7 | 1.0<br>2.6 |
| Do | 275 | 0.55 | Alumina on Silica gel. | 100–172, 760 mm<br>150–220, 1 mm | 0.913<br>1.047 | 1.15<br>261.0 | 79.8<br>79.0 | 10.8<br>9.3 | 9.4<br>11.7 |

Example 1

A vertical silica tube, one inch in diameter, was packed with pellets of an aluminium silicate catalyst, the catalyst volume being 200 mls., and maintained at 300°–320° C. A stream of nitrogen, as carrier, was passed in at the top of the tube at a rate of 4 liters per hour together with 2,3-dihydropyran at a rate such that 262 mls. were fed in 6¼ hours, and there was collected from the bottom of the tube 185 mls. of a brown, oily liquid and 20 mls. of a lower aqueous layer. The oily liquid was distilled to give 114 mls. of a liquid boiling at 62°–105° C., which was chiefly impure 2,3-dihydropyran, and 23 mls. of a fraction boiling at 105°–180° C. The residue, comprising 43 mls., was a very mobile liquid having a molecular weight of 200 as compared with 84 for dihydropyran. Analysis of this liquid showed that some dehydration and polymerisation had occurred. On distillation at reduced pressure there was obtained in good yield a stable, straw-colored, mobile liquid having a B. P. of 70°–130° C./23 mms. of mercury and which was immiscible with water.

The aluminium silicate catalyst was prepared as follows. 228 gms. of flake caustic soda was dissolved in 8 gms. of a commercial sodium silicate containing 9% $Na_2O$ and 30% $SiO_2$ to give the composition $Na_2SiO_3$ and the product was dissolved in 60 mls. of distilled water and heated to 70° C. This solution was then pumped during about ½ hour via a spray nozzle to a solution of aluminium nitrate prepared by dissolving 30 gms. of $Al(NO_3)_3 9H_2O$ in 60 mls. of water also heated to 70° C., the mixture being agitated the while. The precipitation was completed by the addition of 12.8 mls. of 35% aqueous ammonia and after the addition of 80 mls. of water the mixture was allowed to stand for 18 hours. The precipitate was filtered off and well washed, and was dried at 105° C. and ignited at 500° C. It was then pelleted with the aid of a small amount of graphite.

Example 2

250 gms. of 2,3-dihydropyran was passed over a catalyst comprising phosphoric acid supported on kieselguhr (catalyst volume, 200 mls.) maintained at about 275° C. at a liquid space velocity of 0.4 $hour^{-1}$ employing 0.1 $hour^{-1}$ of nitrogen as carrier gas. There were obtained as product 69 gms. of organic liquid and 29 gms. of separable water.

The liquid on distillation at atmospheric pressure yielded 30 gms. of a fraction with a boiling range of 86°–200° C. (principally 171°–200° C.) and 6 gms. of a fraction boiling at 200°–270° C.

The pass conversion of 2,3-dihydropyran was 94%.

Example 3

350 gms. of 2,3-dihydropyran was passed over aluminium silicate granules (volume 200 mls.) maintained at a temperature of about 277° C. at a liquid space velocity of 0.55 $hour^{-1}$, employing 0.15 $hour^{-1}$ of nitrogen as carrier gas. There were obtained as product 234 gms. of organic liquid and 15 gms. of separable water.

The organic liquid was distilled at atmospheric pressure and yielded 25 gms. of a fraction boiling at 86°–172° C. and a residue amounting to 90 gms. On distillation of this residue at a pressure of 1 mm. of mercury there were obtained: 16 gms. of a fraction boiling at 40°–80° C./1 mm.; 12 gms. of a fraction boiling at 80°–150° C./1 mm.; 17 gms. of a fraction boiling at 150°–220° C./1 mm.; 5 gms. of a fraction boiling at 220°–250° C.; and a residue (27 gms.) comprising a black brittle resin. This resin had a softening point of 85°–90° C. and was easily soluble in benzene, carbon tetrachloride furfural and other solvents.

The pass conversion of 2,3-dihydropyran was 66%.

I claim:

1. Process for the production of polymeric substances which comprises subjecting 2,3-dihydropyran to temperatures of 150°–350° C. in the vapor phase under super-atmospheric pressure in the presence of an acidic dehydration catalyst.

2. Process for the production of polymeric substances which comprises subjecting 2,3-dihydropyran to temperatures of 150°–350° C. in the vapor phase in the presence of an acidic dehydration catalyst.

3. Process for the production of polymeric substances which comprises subjecting 2,3-dihydropyran to temperatures of 150°–350° C. in the vapor phase in the presence of aluminium silicate as catalyst.

4. Process for the production of polymeric substances which comprises subjecting 2,3-dihydropyran to temperatures of 150°–350° C. in the vapor phase at atmospheric pressure in the presence of an acidic dehydration catalyst.

5. Process as claimed in claim 4 wherein a temperature of 250°–350° C. is employed.

6. Process for the production of polymeric substances which comprises subjecting 2,3-dihydropyran to temperatures of 250°–350° C. in the vapor phase at atmospheric pressure in the presence of an acidic dehydration catalyst employing a space velocity of up to 1 $hr.^{-1}$.

7. Process for the production of polymeric substances which comprises subjecting 2,3-dihydropyran to temperatures of 150°–350° C. in the vapor phase in the presence of an inert diluent gas and of an acidic dehydration catalyst.

8. A liquid dihydropyran polymer obtained by subjecting 2,3-dihydropyran to temperatures of 150° to 350° C. in the vapor phase in the presence of an acidic dehydration catalyst.

JOHN GEORGE MACKAY BREMNER.

REFERENCES CITED

The following references are of record in the file of this patent:

FOREIGN PATENTS

| Number | Country | Date |
| --- | --- | --- |
| 877,313 | France | Sept. 1, 1942 |
| 558,106 | Great Britain | Dec. 21, 1943 |